J. H. GLAUBER.
SEATING WASHER FOR COCKS.
APPLICATION FILED SEPT. 3, 1907.

928,599.

Patented July 20, 1909.

WITNESSES:
E. M. Fisher
F. C. Mussun

INVENTOR.
JOSEPH H. GLAUBER
BY
Fisher & Moort
ATTORNEYS

UNITED STATES PATENT OFFICE.

JOSEPH H. GLAUBER, OF CLEVELAND, OHIO.

SEATING-WASHER FOR COCKS.

No. 928,599.  Specification of Letters Patent.  Patented July 20, 1909.

Application filed September 3, 1907. Serial No. 391,148.

*To all whom it may concern:*

Be it known that I, JOSEPH H. GLAUBER, a citizen of the United States, residing at Cleveland, in the county of Cuyahoga and State of Ohio, have invented certain new and useful Improvements in Seating-Washers for Cocks, and do declare that the following is a full, clear, and exact description of the invention, which will enable others skilled in the art to which it appertains to make and use the same.

My invention relates to a seating washer for cocks, faucets, valves and the like, and the invention consists in a washer having a body of disk shape and of suitable material inclosed by a metallic rim or band about its edge and adapted to form a close seat of unchangeable outer dimensions, all substantially as shown and described and particularly pointed out in the claims.

Figure 1:
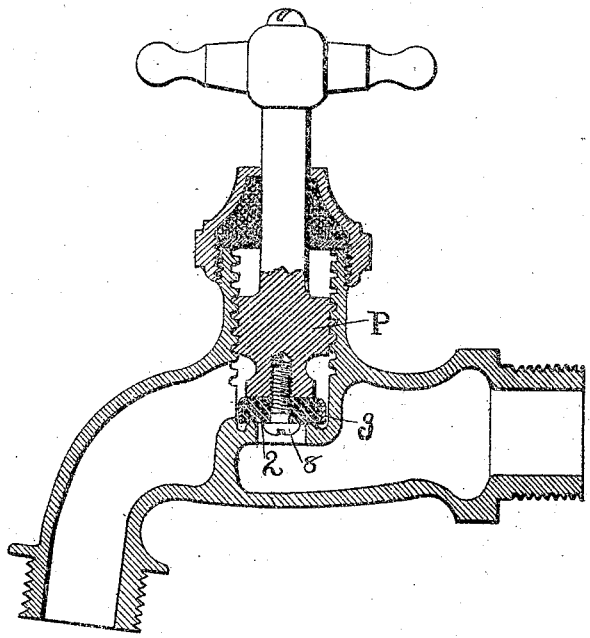
Figure 2:
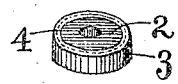
Figure 3:
Figure 4:

In the accompanying drawings, Figure 1 is a vertical sectional elevation of a faucet showing my improved washer affixed to the valve plug and seated thereon. Fig. 2 is a perspective view of the washer itself, and Figs. 3 and 4 are cross sections or modifications of the washer.

As faucets are usually constructed the space between the edge of the usual disk or washer affixed to the valve plug and the surrounding wall of the faucet where the plug is seated is exceedingly limited, so that when the usual spreading of the washer occurs by reason of continued use the very slight intervening space is liable to be substantially closed by the disk, and hence it follows that when the valve plug is but slightly raised the water forces through in a spray which, as it strikes the interior and sides of the outlet spout, is diverted down and out in a spreading and splattering flow, which, in any case, is very undesirable. To remedy this objection I have provided a construction of washer or disk to take the place of disks or washers as heretofore made which will hold its shape and size to the end of its service and not spread or expand however long it may be used. That is to say, the disk in common use is merely a circular piece of leather, rubber or a compound of more or less fibrous, flexible and expansible material which, in use, spreads or widens so as to become objectionable as above pointed out. I overcome this defect in the old washer by taking a disk or body 2 of any suitable material, say of rubber, leather, fiber, or the like, and of the usual size, substantially, and inclose the same about its circumferential edge with a ring or band —3— of a suitable metal which is non-expansible and will hold its place permanently upon the said disk or body —2— and prevent the spreading of the washer, as is obvious from the views shown. The said ring or band —3— may be variously fashioned and have a flange portion —4— to engage over the upper surface of the disk as in Figs. 1 and 2, or it may be a plain ring or band as at —5—, Fig. 3, or a ring or band —6— with an annular depression at its center engaging in a corresponding depression in body or disk —2— and thereby locking the band on the disk. However, the tendency in the disk to expand is believed to be sufficient in service to hold the ring in place upon the edge of the disk, and hence the washer may be constructed with a plain ring as in Fig. 3 and serve my purpose, or with suitable engaging means as in Figs. 2 and 4. When thus constructed the washer is secured to plug P of the faucet by a screw 8, as usual, and in this way the generally acknowledged annoyance of washers spreading and causing splattering of the outflowing water is entirely prevented, and the life and service of the washer is greatly prolonged, thus working material benefit to the public.

One of the advantages of a washer of the kind described is that the same may be reversed when the valve seat wears the lower side of the washer and a new seat is desired. As shown, either face of the washer may be used to seat upon the valve seat.

A further advantage of the double faced washer with a reinforcement at its edge is that all leakage is absolutely prevented in and about the screw opening centrally of the washer because the pressure brought to bear upon the washer in seating the same uniformly, seals the end of the stem as well as the primary valve seat.

What I claim is:—

1. The combination of a faucet having a main valve seat and inclosing walls about the same relatively near thereto, with a screw stem having a lower flattened end of substantially the same diameter as said seat and a central screw opening therein, and a washer mounted upon the end of said stem and secured thereto by a screw and comprising a disk shaped body made of solid compressible material throughout with a central opening of the same relative diameter as said screw and having top and bottom seating faces adapted to rest flat against said stem end and said seat, and provided with a metallic reinforcing band about its circumferential edge of the same relative depth as said body to prevent lateral enlargement of said washer and to maintain the same relative open space about the washer and between the inclosing walls opposite thereto at all times, whereby a spreading and splattering outflow from the faucet is prevented.

2. In means to prevent a spreading and splattering outflow from faucets, a faucet having a valve plug and a seating chamber and a spout, in combination with a compressible seating disk for said plug having a non-yielding metallic band about its edge, said disk being adapted to form a yielding seat of unchangeable outer dimensions, and said seating chamber formed with circular surrounding walls of slightly larger diameter than said band and spaced uniformly apart therefrom entirely around its circumference to permit an annular unbroken film of liquid to be discharged into said chamber upon initial opening of the valve seat for the purposes set forth.

3. In means to prevent a spreading and splattering outflow from faucets, a faucet having a valve plug and a circular walled chamber and seat and a spout open to said chamber, in combination with a reversible compressible seating disk removably affixed and centrally related to said plug and having an annular non-yielding reinforcing band about its edge of relatively slightly smaller diameter than said chamber and uniformly spaced apart from said chamber walls to permanently prevent a jet like flow of liquid to pass at any point about the entire circumference of said band during initial opening of said valve plug.

4. As an article of manufacture and sale, a seating washer for faucets comprising a disk of yielding material having opposite seating faces and a central through opening of smaller diameter than said seating faces, and a non-spreading metallic band about said disk within the planes of the said opposite seating faces, said disk and band being adapted to fit closely within the faucet chamber to permanently prevent a spreading and splattering discharge from the faucet spout.

5. A valve member for faucets adapted to prevent a splattering discharge of water therefrom, comprising a disk of yielding material having opposite seating faces and a central opening, and a flat non-yielding non-spreading metallic band of permanent diameter having an annular groove and rib adapted to have interlocking engagement with the periphery of said disk between its seating faces.

In testimony whereof I sign this specification in the presence of two witnesses.

JOSEPH H. GLAUBER.

Witnesses:
R. B. MOSER,
E. M. FISHER.